3,049,549
LIPOIC ACID AND DERIVATIVES

Lester J. Reed, Austin, Tex., and Irwin C. Gunsalus, Urbana, Ill., assignors to Research Corporation, New York, N.Y., a corporation of New York
No Drawing. Filed Mar. 22, 1954, Ser. No. 417,918
7 Claims. (Cl. 260—327)

This invention relates to novel compounds and more particularly to novel compounds which are growth factors and are related in properties to the B-group of vitamins.

The new compounds are characterized by an ability to augment oxidation of pyruvate, and to replace acetate in respect to certain lactic acid bacteria which require acetate in the culture media in which the bacteria are grown.

The compounds of this invention comprise two closely related acids which are interconvertible, and the salts and esters of those acids. We have assigned to the two new acids we have discovered the names α-lipoic and β-lipoic acid, and for the sake of convenience the compounds described in this invention will be identified hereing as α- or β-lipoic acid and as the esters and salts of α- and β-lipoic acid.

α-Lipoic acid and be represented by the following formula

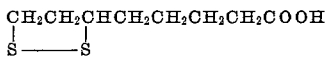

and β-lipoic acid can be represented by the following formula

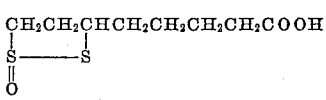

It will be seen from the above formulas that the α- and β-lipoic acids are, respectively, a cyclic disulfide and a cyclic disulfide oxide derivative of a dimercaptooctanoic acid.

The compounds of this invention can be obtained from a wide variety of starting materials. Among suitable source materials for the preparation of the compounds are liver, liver residue, that is, liver from which certain water-soluble extractives have been removed, yeast, and various cultures of antibiotic-producing and other organisms, for example, the mycelia produced by the growth of a penicillin-producing mold.

Our novel factors do not exist as such in the source materials listed above, for the testing of those materials does not reveal the presence of pyruvate oxidation factors. Pyruvate oxidation activity is obtained after the source materials have been hydrolyzed. We do not know whether the hydrolysis liberates our novel factors from inactive combinations in which they exist in the source material, or whether the hydrolysis produces some rearrangement or other chemical reaction whereby the factors are produced.

The activation of the source material and the production of our novel factors are accomplished by a hydrolytic process which can be effected in any of a number of ways. The most convenient method of activation is a simple hydrolysis with aqueous alkali or preferably aqueous acid. Alternatively, hydrolysis by means of proteolytic enzymes can be employed, and in the case of those source materials which themselves contain a suitable ferment, e.g., liver, and mold mycelia, the hydrolysis can be effected by autolysis.

Activation of the source material results in a composition in which our novel growth factors are present in extremely minute quantity, and suitable concentration procedures must be employed to provide the novel compounds in concentrated or pure form. A convenient concentration process is carried out by means of chromatography employing chromatographic agents such as silica gel, aluminum oxide and the like, or one of the commercially available magnesium aluminum silicates. By such procedure, not only can the novel factors be separated from the large amount of inert material in the source material, but also the α- and β-lipoic acids, or their derivatives, can be separated from each other. Another suitable procedure for the separation of a mixture of α- and β-lipoic acid compounds into its component parts consists in the employment of countercurrent extraction procedures. Suitable detailed methods for obtaining and separating the lipoic acids, the esters, and the salts of this invention will be set forth in detail in the examples to follow.

The salts and esters of α- and β-lipoic acids can be prepared from the acids by conventional procedures. Esters of the lipoic acids are obtained by treatment of the acid with a diazoalkane or by heating the lipoic acid with an alcohol in the presence of an inorganic acid, or by other customary esterification procedures. As will be apparent to those skilled in the art, numerous esters of the lipoic acids can be prepared by the above methods. Illustrative esters include the phenyl, benzyl, and aliphatic hydrocarbon esters. Of these, the preferred esters are the lower alkyl esters, for example the methyl, ethyl, propyl, etc., esters.

Salts of the lipoic acids can be prepared by the usual methods, for example by reacting the lipoic acid with an equivalent amount of a metal oxide or hydroxide or a metal carbonate or bicarbonate. A wide variety of salts can be obtained by the forementioned methods, including heavy metal, ammonium and amine salts. The preferred salts are those which are water-soluble and are relatively non-toxic to living organisms, such as salts formed from the alkali metals, the alkaline earth metals, and the ammonium radicals, for example the sodium, potassium, calcium, ammonium and ethanolamine salts.

Care should be taken in carrying out the above ester and salt conversions if substantially pure α- and β-lipoic acid compounds are desired, because of the ready interconvertibility of the α- and β-lipoic acids. However, since both the α- and β-lipoic acids as well as their salts and esters have approximately equivalent potency (on a molecular weight basis) with respect to their physiological activities, it is a matter of relatively little importance for phamacological and therapeutic purposes whether a pure compound or a mixture is obtained.

The most satisfactory method of determining the concentration or purity of the novel compounds of this invention (other than when they are in crystalline form) involved the utilization of microbiological tests. Two microbiological test methods can be employed; one consisting of the quantitative determination of the enhancement of oxygen utilization by Streptococcus faecalis in a pyruvate-containing medium, this being the pyruvate oxidation factor (POF) test, and the other consisting of the measurement of the growth of Sterptococcus lactis in an acetate-deficient medium, this being the acetate-replacing factor (ARF) test. In the POF test, the lipoic acids possess an activity of about 250,000 units/mg. and in the ARF test, an activity about 15,000,000 units/mg. The salts and esters, bearing in mind their altered molecular weights, have comparable activities.

The POF and ARF test procedures are carried out as follows:

PYRUVATE OXIDATION FACTOR TEST

The organism employed in carrying out the pyruvate oxidation factor test is *Streptococcus faecalis*, strain 10C1. A stock culture of the organism is maintained by growing it in AC broth (1 percent tryptone, 1 percent yeast extract, 0.5 percent $KH_2PO_4$ and 0.1 percent glucose), and transferring it at least once a week. An active culture to be used in the test is maintained by transferring two drops of the AC broth culture to a fresh tube of AC broth at 24-hour intervals.

To obtain cells for carrying out the assay procedure, four drops of the active AC broth containing the *S. faecalis* are transferred to 100 ml. of synthetic medium having the following composition:

| | Per liter |
|---|---|
| Acid hydrolyzed casein ($N_2SO_4$) | g-- 10 |
| Enzyme-hydrolyzed casein | g-- 7.5 |
| Glucose | g-- 3 |
| $K_2HPO_4$ | g-- 5 |
| Na thioglycollate | mg-- 100 |
| DL-tryptophane | mg-- 200 |
| L-cystine | mg-- 200 |
| Adenine, guanine, uracil each | mg-- 25 |
| Nicotinic acid | mg-- 5 |
| Riboflavin | mg-- 1 |
| Pyridoxine.HCl | mg-- 1 |
| Thiamin.HCl | mg-- 1 |
| Ca pantothenate | mg-- 1 |
| Folic acid | μg-- 10 |
| Biotin | μg-- 1 |
| Salts B | ml-- 5 |

Final pH 7.0–7.3, autoclave 15 min. at 15 lbs.

Salts B/250 ml.: G.
| | |
|---|---|
| $MgSO_4 \cdot 7H_2O$ | 10 |
| NaCl | 0.5 |
| $FeSO_4 \cdot 6H_2O$ | 0.5 |
| $MnSO_4 \cdot 4H_2O$ | 0.5 |
| Ascorbic acid | 0.5 |

The transfer is incubated for a period of about 14 hours, the cells are centrifuged and suspended in M/30 phosphate buffer pH 6.5 to a cell concentration of 20 to 25 mg. dry weight per ml.

The rate of pyruvate oxidation by cell suspensions is measured manometrically at pH 6.5 in M/20 phosphate buffer. The cells, buffer, and other additions are added to the main compartment of the Warburg cup and 25 or 60 micromoles of potassium pyruvate tipped from the sidearm.

To assay for pyruvate oxidation factor (POF), cells harvested from the synthetic medium (free of POF) are used in a level 4 to 5 mg. of cells per cup in accordance with the following procedure.

In the cup:
    0.2 M phosphate buffer, pH 6.5, 0.5 ml. Supplements 0.4 ml. Cells (20 mg. (dry weight) per ml.), 0.2 ml. Sample or water to 2.7 ml.
In sidearm: 0.2 M potassium pyruvate, 0.3 ml.
Center well: 20 percent KOH 0.15 ml.
Gas phase: Air, 37°.

The supplement contained the following/0.4 ml.:
| | |
|---|---|
| Magnesium sulfate (anhyd.) | mg-- 2 |
| Thiamine hydrochloride | μg-- 20 |
| Riboflavin | μg-- 40 |
| Adenosine | μg-- 300 |
| Glutamic acid | mg-- 7.5 |

After thermo-equilibration, the pyruvate is tipped from the sidearm and the rate of oxygen uptake is measured over a 40 to 60-minute period, the rate being calculated from the linear portion of the curve. The rates usually become linear 5 to 10 minutes after tipping. With this method, 0.5 to 10 units of POF (activity of 1 mg. of yeast extract standard=1 unit) can be measured. For greatest accuracy and reproducibility a range of 0.5 to about 6 units of POF is preferable.

ACETATE-REPLACING FACTOR TEST

The composition of the acetate-free, phosphate-buffered medium is given below.

TABLE.—COMPOSITION OF DOUBLE STRENGTH MEDIUM

| Solution 1 | | Amount for 20 assay tubes |
|---|---|---|
| Acid hydrolyzed casein [1] 10 percent | 100 ml | |
| $KH_2PO_4$ | 5 g | |
| L-tryptophane | 200 mg | |
| L-cystine | 200 mg | |
| L-asparagine | 200 mg | |
| Inorganic salts: solution A (25 g. each of $KH_2PO_4$ and $K_2HPO_4$ with water to make 250 ml.) | 10 ml | 100 ml. |
| Inorganic salts: solution B (10 g. $MgSO_4 \cdot 7H_2O$ + 0.5 g. each of $FeSO_4 \cdot 7H_2O$, $MnSO_4 \cdot 4H_2O$ and NaCl with water to make 250 ml.) | 10 ml | |
| pH adjusted to 6.8. | | |
| Water to make | 1,000 ml | |

| Solution 2 | | |
|---|---|---|
| Adenine sulfate | 100 mg | |
| Guanine hydrochloride | 100 mg | |
| Uracil | 100 mg | 2 ml. |
| Hydrochloric acid to effect solution q.s. | | |
| Water to make | 100 ml | |

| Solution 3 | | |
|---|---|---|
| Thiamin chloride | 6 mg | |
| Calcium pantothenate | 6 mg | |
| Riboflavin | 6 mg | |
| Nicotinic acid | 6 mg | |
| Pyridoxine hydrochloride | 100 mg | |
| Inositol | 30 mg | .4 ml. |
| Folic acid | 0.3 mg | |
| p-Aminobenzoic acid | 0.3 mg | |
| Biotin | 0.03 mg | |
| Water to make | 30 ml | |
| Ethyl alcohol to make | 60 ml | |
| Glucose | | 2 g. |

[1] Vitamin-free Labco Casein hydrolyzed with hydrochloric acid according to procedure described in The University of Texas Publication No. 4137, p. 82, is treated with 10 percent by weight of "Darco G-60" at pH 3.0 and 6.8. The final solution is preserved under toluene.

Solution 1 is preserved by autoclaving it for ten minutes at 15 pounds pressure when first made, then steaming it for ten minutes after each removal of an aliquot. Solutions 1, 2 and 3 are combined as indicated and adjusted to pH 6.8. Solutions 2 and 3 are kept in the refrigerator under toluene, and solution 3 is renewed monthly.

To carry out a test, the standard is made up in six tubes containing .3, .7, 1, 1.5, 2, and 3 mg. of anhydrous sodium acetate each in 5 ml. of aqueous solution. The unknowns are diluted to a suitable concentration and introduced into tubes in amounts to give a desirable curve. Specially prepared distilled water is added to bring the volume of solution in every tube to 5 ml., then 5 ml. of the double strength medium is used. The distilled water is prepared as follows:

Boiled distilled water which has been cooled in vacuo is used. This treatment removes oxygen and chlorine, both of which destroy the acetate-replacing factors. Concentrates of the acetate-replacing factors are insoluble in water. Initial dilutions are made with 95 percent ethyl alcohol in such a manner that not more than 0.1 ml. of alcohol is finally present in a single assay tube. Alcohol at this concentration has been shown to be nontoxic for lactic acid bacteria.

The diluted culture tubes are capped with aluminum caps and autoclaved at 15 pounds pressure for ten minutes. After cooling, one drop of prepared inoculum is put into each tube with a blunt-tipped 2 ml. graduated pipette, and the tubes are incubated at 30° for 12–16 hours. After incubation, the turbidity of the solutions is read on a photoelectric turbidimeter so set that distilled water read zero and an opaque object reads 100. The data from the acetate standard are plotted as turbidity versus weight of sodium acetate. The weight of sodium acetate required to give the same turbidity as that obtained from the unknown is determined and the potency of the sample is according to the following formula:

$$\text{Potency} = \frac{\text{Wt. of acetate}}{\text{Wt. of sample giving same growth response}}$$

Units of the acetate-replacing factors (ARF) are expressed in terms of milligrams of acetate, i.e., Potency × wt. of sample (expressed in mg.) = units

*Streptococcus lactis* 8039, the organism used in this test, is carried by monthly transfers on glucose-yeast extract stabs containing 1 percent glucose, 1 percent yeast extract, and 2 percent agar. A stab culture is prepared every two weeks from the stock culture. The organism used for inoculation is taken from the stab culture, transferred to 8 ml. of medium, and allowed to incubate for 18 hours. The cells are centrifuged, resuspended in an equal volume of 0.9 percent saline solution, recentrifuged and resuspended. Two to three drops of the final suspension in 10 ml. of saline are used as inoculum.

The inoculum medium consists of the basal medium to which is added 0.4 ml. for each 50 ml. of double strength medium of acid hydrolyzed liver residue which consists of one gram butyl alcohol-extracted liver residue autoclaved for 3 hours at 120° with 10 cc. 6 N $H_2SO_4$ and adjusted to pH 3 with sodium hydroxide and filtered, the insoluble material being extracted with hot distilled water to give a total volume of combined filtrates of 50–60 ml. The medium is diluted by half with distilled water, and pipetted in 8 ml. portions into short tubes which are sealed with cotton plugs and autoclaved.

Inasmuch as two distinct but interconvertible acids (as well as their esters and salts) possess POF and ARF activity but cannot be distinguished by the foregoing tests, other techniques must be employed for the identification and characterization of the $\alpha$- and $\beta$-lipoic acids. A useful procedure consists of the employment of bioautographs. Bioautographs are obtained by developing paper chromatograms upon agar plates seeded with the assay organism, and are well known to the art. An alternative procedure consists of the employment of countercurrent extraction procedures likewise well known to the art. Specific application of those procedures are described hereinafter.

The following examples further illustrate the novel compounds and methods of this invention.

*Example 1*

The source material employed for the preparation of $\alpha$- and $\beta$-lipoic acids is the liver residue remaining after the water extraction of the ground liver to remove the hematopoietic principles.

About 10 pounds of the liver residue are extracted two or three times with n-butanol at 80°, washed with acetone and dried in the air or in vacuo until the solvent is substantially completely removed and the odor of organic solvents is no longer detectable. This process removes 20 to 25 percent by weight of inactive oily material.

Six pounds of the extracted liver residue are autoclaved for three hours at 120° with 19 l. of 6 N sulfuric acid. The hydrolysate is filtered while hot through a layer of filter aid such as that sold under the name "Hyflo Super-Cel" and the insoluble material is washed with 2 l. of hot water. The combined filtrates possess a volume of 22 l. and an activity of 40–80 ARF units/mg. (based on the weight of extracted liver residue employed). The insoluble material is extracted by steaming it for thirty minutes with two 6 l. portions of water, and the mixture is filtered. These extracts contain 10 to 15 percent of the activity of the original filtered hydrolysate, and are used to prepare the 6 N sulfuric acid employed in subsequent hydrolyses of additional batches of butanol-extracted liver residue.

The 22 l. of hydrolysate are placed in a 22 l. round-bottomed flask equipped with a solvent inlet tube, with a 30 mm. fritted glass disc fitted at one end and extending almost to the bottom of the flask, and an outlet tube for removing the extracting solvent. The mixture is mechanically stirred, and benzene is allowed to drop into the inlet tube at the rate of 300 cc. per hour for a period of approximately 12 hours. The benzene extract (as determined by evaporation of an aliquot of the extract) contains a total of 1.2–1.6 g., of an orange-red oil possessing an activity of 60,000 to 90,000 ARF units/mg., in approximately 70 percent yield. This step represents approximately a 1000-fold concentration over acid-hydrolyzed liver residue. Further extraction of the acid hydrolysate with benzene removes an insignificant amount of active material. Bioautographs of the original acid hydrolysate and of the benzene extracts reveal the presence of two acetate-replacing factors, possessing $R_f$ values 0.85 and 0.65, respectively, with 2,6-lutidine-water as the solvent system. Suitable bioautographs are obtained from paper chromatograms using Whatman No. 1 filter paper and the capillary ascent method of Williams and Kirby [Science 107, 481 (1948)], employing 2,6-lutidine-water (65:35) as the solvent system. The paper chromatograms are air-dried for approximately thirty minutes and placed on seeded agar plates for twenty minutes. At the end of this time the papers are removed and the plates are incubated at 30° for 12 to 16 hours. Zones of growth in the agar indicate the presence of acetate-replacing factors in the sample tested. The seeded agar plates are prepared by adding 2 gm. of agar to 100 cc. of an acetate-free basal medium as described earlier herein, by autoclaving for ten minutes at 120° and cooling, and then by inoculating with 0.2 cc. of a barely visible *Streptococcus lactis* suspension. The mixture is poured into a sterile Pyrex dish, 19 x 30 cm., fitted with an aluminum cover, and allowed to harden before applying the paper chromatogram.

The combined benzene extracts from ten runs carried out as described above are evaporated in vacuo to a volume of approximately 1500 cc. and extracted with three 100 cc. portions of 5 percent sodium bicarbonate solution. The aqueous extracts are acidified to below pH 1 with 6 N sulfuric acid, and extracted with a total of 300 cc. of benzene. This procedure results in a 2- to 3-fold increase in activity with substantially quantitative yield.

Further purification by means of chromatography is carried out as follows: To 320 g. of silica gel in a large motar are added slowly 192 cc. of 2 M potassium dibasic phosphate (pH 8.0). The mixture is ground for several minutes to insure good mixing, is slurried with benzene, and poured into a column of 5 cm. diameter. A solution of the active material (6.36 g. in 95 cc. of benzene) from the sodium bicarbonate extraction procedure is introduced into the silica column, and the column is developed with a solution of 2 percent n-butanol in benzene. Fractions of about 100 cc. volume are collected. The results of the chromatogram and the biological activities of the fraction are presented in Table I.

TABLE I

| Fraction | Weights of solids | Activity, ARF units/mg. | Total units |
|---|---|---|---|
| 0 | 6.36 g | 237,000 | 1,500,000,000 |
| 3–7 | 138 mg | 15,000 | 2,000,000 |
| 8 | 45 mg | 90,000 | 4,000,000 |
| 9 | 70 mg | 312,000 | 22,000,000 |
| 10 | 88 mg | 1,300,000 | 110,000,000 |
| 11 | 88 mg | 3,300,000 | 290,000,000 |
| 12 | 110 mg | 1,600,000 | 180,000,000 |
| 13 | 105 mg | 1,400,000 | 150,000,000 |
| 14 | 95 mg | 1,300,000 | 120,000,000 |
| 15 | 102 mg | 1,200,000 | 120,000,000 |
| 16 | 98 mg | 258,000 | 25,000,000 |
| 17 | 75 mg | 100,000 | 8,000,000 |
| 18–26 | 561 mg | 10,400 | 6,000,000 |
| 27–33 | 805 mg | 4,000 | 3,000,000 |

Fractions 10–15 represent 65 percent of the initial activity, and contain α-lipoic acid as demonstrated by countercurrent distribution procedures. The residue from evaporation of fraction 11 is a light yellow viscous oil. It gives a half-maximum growth of *Streptocccus lactis* at a level of 0.02 mγ per ml. of medium.

A major portion of the activity unaccounted for in the fractions described in Table I is still on the column and can be eluted by means of 95 percent ethanol. Bioautographs and counter current distribution of this eluate show that activity is due mainly to β-lipoic acid having the $R_f$ value 0.65.

*Example 2*

*Preparation of α- and β-lipoic acids.*—Liver residue is extracted with butanol, is hydrolyzed with dilute sulfuric acid, and the hydrolysate is extracted with benzene. The benzene solution is extracted with aqueous sodium bicarbonate solution and the material in the bicarbonate solution is reextracted into benzene after acidification of the bicarbonate solution in accordance with the procedure of Example 1. The benzene extract is evaporated in vacuo and the oily residue is allowed to stand in contact with 30 parts of a 0.7 N solution of dry HCl in absolute methanol at room temperature for 23 hours. At the end of this time the methanol is removed in vacuo and the residue is brought to about pH 8 with 5 percent sodium bicarbonate solution. This mixture is extracted with ethyl acetate. About 90–95 percent of the activity is in the organic layer. The ethyl acetate is removed in vacuo and the residue dissolved in benzene. The benzene layer contains approximately 90 percent of the activity and 60–75 percent of the total solids.

A 10 percent solution of the methyl esters in benzene, prepared as described above, is added to a column prepared by suspending aluminum oxide (Merck reagent grade) in benzene. Approximately 20 g. of alumina are employed for each gram of methyl esters. The column is treated as shown in Table II.

TABLE II

| Fraction | Solvent | Total volume of eluate, ml. | Weight of solids, g. | Activity POF, units/mg. | Total units |
|---|---|---|---|---|---|
| Methyl esters in benzene solution | | | 3.46 | 1,130 | 3,910,000 |
| Bicarbonate soluble material | | | 0.54 | 425 | 248,000 |
| 1–2 | Benzene | 60 | | (¹) | |
| 4 | do | 20 | 0.460 | 3,440 | 1,580,000 |
| 5 | do | 20 | 0.439 | 1,920 | 844,000 |
| 6–13 | do | 250 | | (¹) | |
| 14 | Ether | 50 | | (¹) | |
| 15 | do | 50 | 0.095 | 4,820 | 457,000 |
| 16 | Ethyl acetate | 50 | 0.211 | 2,680 | 567,000 |

¹ Inactive.

The active material removed from the column by benzene contains the methyl ester of α-lipoic acid. That removed by ether and ethyl acetate contains the methyl ester of β-lipoic acid. Each of these fractions can be further purified by rechromatographing on alumina. Details of such a purification of the methyl ester of α-lipoic acid are presented in Table III. A 10–20 percent solution of the concentrate in "Skellysolve" B is added to a column prepared by suspending alumina (approximately 20 g. to 1 g. of concentrate) in "Skellysolve" B.

TABLE III

| Fraction | Solvent | Vol., cc. | Weight of solids, g. | Activity POF, units/mg. | Total units |
|---|---|---|---|---|---|
| α-Ester | | | 1.33 | 2,200 | 2,930,000 |
| 1–5 | "Skellysolve" B | 100 | 0.581 | (¹) | |
| 6–12 | 10 percent benzene in "Skellysolve" B. | 150 | 0.211 | 10,200 | 2,150,000 |
| 13+14 | 10 percent benzene | 60 | 0.038 | 3,400 | 104,000 |
| 15 | 30 percent benzene | | | | |
| 16–18 | do | 80 | 0.056 | (¹) | |
| 19 | Benzene | | | | |
| 20+21 and 22 | Benzene Ethyl acetate | 60 | 0.073 | (¹) | |
| 23 | Ethyl acetate | 40 | 0.038 | 3,600 | 110,000 |
| 24 | Methyl alcohol | 40 | | | 716,000 |

¹ Inactive.

Cyanide treated alumina is also useful in purifying the methyl esters of α- and β-lipoic acids. Details of an experiment in which cyanide-treated alumina is employed are presented in Table IV. A 10 percent solution of mixed methyl esters of the lipoic acids which had been extracted with 5 percent sodium hydroxide, in a 50:50 mixture of benzene and "Skellysolve" B, is added to a column prepared by suspending 270 g. of alumina in the same solvent mixture.

TABLE IV

| Fraction | Solvent | Total volume of eluate, cc. | Weight of solids, g. | Activity POF, units/mg. | Total units |
|---|---|---|---|---|---|
| Methyl esters | | | 13.46 | 1,730 | 20,350,000 |
| 1–5 | 50–50 mixture of benzene and "Skellysolve" B. | 400 | | (¹) | |
| 6–14 | do | 350 | 1.845 | } 3,980 | 9,380,000 |
| 15 | Benzene | 115 | 0.510 | | |
| 16 | do | 100 | | (¹) | |
| 17–21 | 10 percent ethyl acetate in benzene. | 600 | | (¹) | |
| 22–25 | 20 percent ethyl acetate. | 400 | } 1.785 | } 4,540 | 8,100,000 |
| 26–30 | 40 percent ethyl acetate. | 500 | | | |
| 31 | Ethyl acetate | 400 | | (¹) | |

¹ Inactive.

The α-methyl lipoic acid ester which has been chromatographed twice on alumina and which possesses a potency of 10,000 POF units/mg. or better, is subjected to chromatography on 60/100 mesh "Florisil" (Floridin Co., Warren, Pa.). A 10–15 percent solution of the ester in "Skellysolve" B is passed over a column of "Florisil" (100 parts to 1 part of ester) suspended in "Skellysolve"

ethyl alcohol in such a manner that not more than 0.1 ml. of alcohol is finally present in a single assay tube. Alcohol at this concentration has been shown to be nontoxic for lactic acid bacteria.

The diluted culture tubes are capped with aluminum caps and autoclaved at 15 pounds pressure for ten minutes. After cooling, one drop of prepared inoculum is put into each tube with a blunt-tipped 2 ml. graduated pipette, and the tubes are incubated at 30° for 12–16 hours. After incubation, the turbidity of the solutions is read on a photoelectric turbidimeter so set that distilled water read zero and an opaque object reads 100. The data from the acetate standard are plotted as turbidity versus weight of sodium acetate. The weight of sodium acetate required to give the same turbidity as that obtained from the unknown is determined and the potency of the sample is according to the following formula:

$$\text{Potency} = \frac{\text{Wt. of acetate}}{\text{Wt. of sample giving same growth response}}$$

Units of the acetate-replacing factors (ARF) are expressed in terms of milligrams of acetate, i.e., Potency × wt. of sample (expressed in mg.) = units

*Streptococcus lactis* 8039, the organism used in this test, is carried by monthly transfers on glucose-yeast extract stabs containing 1 percent glucose, 1 percent yeast extract, and 2 percent agar. A stab culture is prepared every two weeks from the stock culture. The organism used for inoculation is taken from the stab culture, transferred to 8 ml. of medium, and allowed to incubate for 18 hours. The cells are centrifuged, resuspended in an equal volume of 0.9 percent saline solution, recentrifuged and resuspended. Two to three drops of the final suspension in 10 ml. of saline are used as inoculum.

The inoculum medium consists of the basal medium to which is added 0.4 ml. for each 50 ml. of double strength medium of acid hydrolyzed liver residue which consists of one gram butyl alcohol-extracted liver residue autoclaved for 3 hours at 120° with 10 cc. 6 N $H_2SO_4$ and adjusted to pH 3 with sodium hydroxide and filtered, the insoluble material being extracted with hot distilled water to give a total volume of combined filtrates of 50–60 ml. The medium is diluted by half with distilled water, and pipetted in 8 ml. portions into short tubes which are sealed with cotton plugs and autoclaved.

Inasmuch as two distinct but interconvertible acids (as well as their esters and salts) possess POF and ARF activity but cannot be distinguished by the foregoing tests, other techniques must be employed for the identification and characterization of the α- and β-lipoic acids. A useful procedure consists of the employment of bioautographs. Bioautographs are obtained by developing paper chromatograms upon agar plates seeded with the assay organism, and are well known to the art. An alternative procedure consists of the employment of countercurrent extraction procedures likewise well known to the art. Specific application of those procedures are described hereinafter.

The following examples further illustrate the novel compounds and methods of this invention.

*Example 1*

The source material employed for the preparation of α- and β-lipoic acids is the liver residue remaining after the water extraction of the ground liver to remove the hematopoietic principles.

About 10 pounds of the liver residue are extracted two or three times with n-butanol at 80°, washed with acetone and dried in the air or in vacuo until the solvent is substantially completely removed and the odor of organic solvents is no longer detectable. This process removes 20 to 25 percent by weight of inactive oily material.

Six pounds of the extracted liver residue are autoclaved for three hours at 120° with 19 l. of 6 N sulfuric acid. The hydrolysate is filtered while hot through a layer of filter aid such as that sold under the name "Hyflo Super-Cel" and the insoluble material is washed with 2 l. of hot water. The combined filtrates possess a volume of 22 l. and an activity of 40–80 ARF units/mg. (based on the weight of extracted liver residue employed). The insoluble material is extracted by steaming it for thirty minutes with two 6 l. portions of water, and the mixture is filtered. These extracts contain 10 to 15 percent of the activity of the original filtered hydrolysate, and are used to prepare the 6 N sulfuric acid employed in subsequent hydrolyses of additional batches of butanol-extracted liver residue.

The 22 l. of hydrolysate are placed in a 22 l. round-bottomed flask equipped with a solvent inlet tube, with a 30 mm. fritted glass disc fitted at one end and extending almost to the bottom of the flask, and an outlet tube for removing the extracting solvent. The mixture is mechanically stirred, and benzene is allowed to drop into the inlet tube at the rate of 300 cc. per hour for a period of approximately 12 hours. The benzene extract (as determined by evaporation of an aliquot of the extract) contains a total of 1.2–1.6 g., of an orange-red oil possessing an activity of 60,000 to 90,000 ARF units/mg., in approximately 70 percent yield. This step represents approximately a 1000-fold concentration over acid-hydrolyzed liver residue. Further extraction of the acid hydrolysate with benzene removes an insignificant amount of active material. Bioautographs of the original acid hydrolysate and of the benzene extracts reveal the presence of two acetate-replacing factors, possessing $R_f$ values 0.85 and 0.65, respectively, with 2,6-lutidine-water as the solvent system. Suitable bioautographs are obtained from paper chromatograms using Whatman No. 1 filter paper and the capillary ascent method of Williams and Kirby [Science 107, 481 (1948)], employing 2,6-lutidine-water (65:35) as the solvent system. The paper chromatograms are air-dried for approximately thirty minutes and placed on seeded agar plates for twenty minutes. At the end of this time the papers are removed and the plates are incubated at 30° for 12 to 16 hours. Zones of growth in the agar indicate the presence of acetate-replacing factors in the sample tested. The seeded agar plates are prepared by adding 2 gm. of agar to 100 cc. of an acetate-free basal medium as described earlier herein, by autoclaving for ten minutes at 120° and cooling, and then by inoculating with 0.2 cc. of a barely visible *Streptococcus lactis* suspension. The mixture is poured into a sterile Pyrex dish, 19 x 30 cm., fitted with an aluminum cover, and allowed to harden before applying the paper chromatogram.

The combined benzene extracts from ten runs carried out as described above are evaporated in vacuo to a volume of approximately 1500 cc. and extracted with three 100 cc. portions of 5 percent sodium bicarbonate solution. The aqueous extracts are acidified to below pH 1 with 6 N sulfuric acid, and extracted with a total of 300 cc. of benzene. This procedure results in a 2- to 3-fold increase in activity with substantially quantitative yield.

Further purification by means of chromatography is carried out as follows: To 320 g. of silica gel in a large mortar are added slowly 192 cc. of 2 M potassium dibasic phosphate (pH 8.0). The mixture is ground for several minutes to insure good mixing, is slurried with benzene, and poured into a column of 5 cm. diameter. A solution of the active material (6.36 g. in 95 cc. of benzene) from the sodium bicarbonate extraction procedure is introduced into the silica column, and the column is developed with a solution of 2 percent n-butanol in benzene. Fractions of about 100 cc. volume are collected. The results of the chromatogram and the biological activities of the fraction are presented in Table I.

TABLE I

| Fraction | Weights of solids | Activity, ARF units/mg. | Total units |
|---|---|---|---|
| 0 | 6.36 g | 237,000 | 1,500,000,000 |
| 3-7 | 138 mg | 15,000 | 2,000,000 |
| 8 | 45 mg | 90,000 | 4,000,000 |
| 9 | 70 mg | 312,000 | 22,000,000 |
| 10 | 88 mg | 1,300,000 | 110,000,000 |
| 11 | 88 mg | 3,300,000 | 290,000,000 |
| 12 | 110 mg | 1,600,000 | 180,000,000 |
| 13 | 105 mg | 1,400,000 | 150,000,000 |
| 14 | 95 mg | 1,300,000 | 120,000,000 |
| 15 | 102 mg | 1,200,000 | 120,000,000 |
| 16 | 98 mg | 258,000 | 25,000,000 |
| 17 | 75 mg | 100,000 | 8,000,000 |
| 18-26 | 561 mg | 10,400 | 6,000,000 |
| 27-33 | 805 mg | 4,000 | 3,000,000 |

Fractions 10–15 represent 65 percent of the initial activity, and contain α-lipoic acid as demonstrated by countercurrent distribution procedures. The residue from evaporation of fraction 11 is a light yellow viscous oil. It gives a half-maximum growth of *Streptocccus lactis* at a level of 0.02 mγ per ml. of medium.

A major portion of the activity unaccounted for in the fractions described in Table I is still on the column and can be eluted by means of 95 percent ethanol. Bioautographs and counter current distribution of this eluate show that activity is due mainly to β-lipoic acid having the $R_f$ value 0.65.

*Example 2*

*Preparation of α- and β-lipoic acids.*—Liver residue is extracted with butanol, is hydrolyzed with dilute sulfuric acid, and the hydrolysate is extracted with benzene. The benzene solution is extracted with aqueous sodium bicarbonate solution and the material in the bicarbonate solution is reextracted into benzene after acidification of the bicarbonate solution in accordance with the procedure of Example 1. The benzene extract is evaporated in vacuo and the oily residue is allowed to stand in contact with 30 parts of a 0.7 N solution of dry HCl in absolute methanol at room temperature for 23 hours. At the end of this time the methanol is removed in vacuo and the residue is brought to about pH 8 with 5 percent sodium bicarbonate solution. This mixture is extracted with ethyl acetate. About 90–95 percent of the activity is in the organic layer. The ethyl acetate is removed in vacuo and the residue dissolved in benzene. The benzene layer contains approximately 90 percent of the activity and 60–75 percent of the total solids.

A 10 percent solution of the methyl esters in benzene, prepared as described above, is added to a column prepared by suspending aluminum oxide (Merck reagent grade) in benzene. Approximately 20 g. of alumina are employed for each gram of methyl esters. The column is treated as shown in Table II.

TABLE II

| Fraction | Solvent | Total volume of eluate, ml. | Weight of solids, g. | Activity POF, units/mg. | Total units |
|---|---|---|---|---|---|
| Methyl esters in benzene solution | | | 3.46 | 1,130 | 3,910,000 |
| Bicarbonate soluble material | | | 0.54 | 425 | 248,000 |
| 1-2 | Benzene | 60 | | (¹) | |
| 4 | do | 20 | 0.460 | 3,440 | 1,580,000 |
| 5 | do | 20 | 0.439 | 1,920 | 844,000 |
| 6-13 | do | 250 | | (¹) | |
| 14 | Ether | 50 | | (¹) | |
| 15 | do | 50 | 0.095 | 4,820 | 457,000 |
| 16 | Ethyl acetate | 50 | 0.211 | 2,680 | 567,000 |

¹ Inactive.

The active material removed from the column by benzene contains the methyl ester of α-lipoic acid. That removed by ether and ethyl acetate contains the methyl ester of β-lipoic acid. Each of these fractions can be further purified by rechromatographing on alumina. Details of such a purification of the methyl ester of α-lipoic acid are presented in Table III. A 10–20 percent solution of the concentrate in "Skellysolve" B is added to a column prepared by suspending alumina (approximately 20 g. to 1 g. of concentrate) in "Skellysolve" B.

TABLE III

| Fraction | Solvent | Vol., cc. | Weight of solids, g. | Activity POF, units/mg. | Total units |
|---|---|---|---|---|---|
| α-Ester | | | 1.33 | 2,200 | 2,930,000 |
| 1-5 | "Skellysolve" B | 100 | 0.581 | (¹) | |
| 6-12 | 10 percent benzene in "Skellysolve" B | 150 | 0.211 | 10,200 | 2,150,000 |
| 13+14 | 10 percent benzene | 60 | 0.038 | 3,400 | 104,000 |
| 15 | 30 percent benzene | | | | |
| 16-18 | do | 80 | 0.056 | (¹) | |
| 19 | Benzene | | | | |
| 20+21 and 22 | Benzene Ethyl acetate | 60 | 0.073 | (¹) | |
| 23 | Ethyl acetate | 40 | 0.038 | 3,600 | 110,000 |
| 24 | Methyl alcohol | 40 | | | 716,000 |

¹ Inactive.

Cyanide treated alumina is also useful in purifying the methy esters of α- and β-lipoic acids. Details of an experiment in which cyanide-treated alumina is employed are presented in Table IV. A 10 percent solution of mixed methyl esters of the lipoic acids which had been extracted with 5 percent sodium hydroxide, in a 50:50 mixture of benzene and "Skellysolve" B, is added to a column prepared by suspending 270 g. of alumina in the same solvent mixture.

TABLE IV

| Fraction | Solvent | Total volume of eluate, cc. | Weight of solids, g. | Activity POF, units/mg. | Total units |
|---|---|---|---|---|---|
| Methyl esters | | | 13.46 | 1,730 | 20,350,000 |
| 1-5 | 50-50 mixture of benzene and "Skellysolve" B | 400 | | (¹) | |
| 6-14 | do | 350 | 1.845 | 3,980 | 9,380,000 |
| 15 | Benzene | 115 | 0.510 | | |
| 16 | do | 100 | | (¹) | |
| 17-21 | 10 percent ethyl acetate in benzene | 600 | | (¹) | |
| 22-25 | 20 percent ethyl acetate | 400 | 1.785 | 4,540 | 8,100,000 |
| 26-30 | 40 percent ethyl acetate | 500 | | | |
| 31 | Ethyl acetate | 400 | | (¹) | |

¹ Inactive.

The α-methyl lipoic acid ester which has been chromatographed twice on alumina and which possesses a potency of 10,000 POF units/mg. or better, is subjected to chromatography on 60/100 mesh "Florisil" (Floridin Co., Warren, Pa.). A 10–15 percent solution of the ester in "Skellysolve" B is passed over a column of "Florisil" (100 parts to 1 part of ester) suspended in "Skellysolve"

B. The details of a typical chromatogram are presented in Table V.

TABLE V

| Fraction | Solvent | Vol., cc. | Weight of solids, mg. | Activity POF, units/mg. | Total units |
|---|---|---|---|---|---|
| α-Ester | | | 135.6 | 13,500 | 1,830,000 |
| 1-5 | 10 percent benzene in "Skellysolve" B. | 100 | 7.9 | 520 | |
| 6-10 | 20 percent benzene | 100 | 18.9 | 570 | |
| 11-16 | do | 120 | 2.4 | 7,200 | |
| 17 | do | 20 | 1.3 | 21,000 | |
| 18-28 | do | 220 | 18.8 | 86,000 | 1,610,000 |
| 29 | Benzene | 20 | 14.2 | 8,800 | |
| 30 | do | 20 | 15.8 | 900 | |
| 31 | Ethyl acetate | 20 | 33.6 | 3,000 | |

By this procedure methyl α-lipoate having a purity upwards of about 50 percent can be obtained.

Methyl β-lipoate can be purified in substantially the same manner except that the elution is carried out by employing a mixture of benzene and ethyl acetate.

*Example 3*

The methyl ester of α-lipoic acid which possesses a potency upwards of about 70,000 POF units per mg. is suitable for obtaining crystalline α-lipoic acid. The α-ester is shaken at room temperature for about 6 hours with 0.1 N NaOH (10 mg. ester per ml. of alkali). This treatment results in approximately 60 percent saponification. The unsaponified ester is recovered by extraction of the reaction mixture with "Skellysolve" B and is subjected to treatment with fresh alkali. The alkaline solution is acidified and extracted thoroughly with "Skellysolve" B. The latter extracts are evaporated in vacuo to give a light yellow viscous oil. The oil is dissolved in a minimum amount of warm "Skellysolve" B and placed in a refrigerator. Seeding the solution or scratching the inside of the vessel is necessary to prevent the α-lipoic acid from separating as an oil. The α-lipoic acid separates in the form of platelets, possessing a faint yellow tinge. The activity of the crystalline material is unchanged after two more recrystallizations from "Skellysolve" B. The material thus obtained melts on the microstage at about 47.5–48.5° C. α-Lipoic acid is an acidic substance, possessing a pKa of 4.7; and a neutral equivalent of about 224. It possesses a potency of about 250,000 POF units/mg. and 15,000,000 ARF units/mg.

X-ray diffraction data of crystalline α-lipoic and "d" interplanar spacings:

| | Relative intensity, I/I° |
|---|---|
| 8.65 | .05 |
| 7.47 | .05 |
| 6.35 | .05 |
| 5.70 | .05 |
| 5.30 | .10 |
| 4.82 | 1.00 |
| 4.69 | .05 |
| 4.52 | .10 |
| 4.24 | .10 |
| 4.04 | .80 |
| 3.85 | .50 |
| 1.63 | .05 |
| 3.53 | .10 |
| 3.28 | .05 |
| 2.99 | .10 |
| 2.57 | .05 |
| 2.35 | .05 |
| 2.30 | .05 |

The infrared absorption spectrum of a solution of α-lipoic acid in carbon tetrachloride shows absorption bands at the following wavelengths expressed in $\mu$: 2.78; 3.39; 5.85; 6.92; 7.07; 7.77; 8.04; 8.24; 10.68.

*Example 4*

A method of separation α- and β-lipoic acids by the countercurrent extraction process is carried out in the following manner. For the separation a mixture of crude or purified α- and β-lipoic acids can be employed. In this example, a mixture of crude lipoic acids having a total activity of about 3,000,000+ POF units and a dry weight of about 1.61 g. and dissolved in 20 ml. of benzene, is brought to a volume of about 50 ml. by the addition of peroxide-free ether.

Twenty bottles of about 125 ml. capacity are provided and placed in order, and to each bottle are added 50 ml. of M/5 phosphate buffer of pH 6.5. 50 ml. of peroxide-free ether are added to the first of the twenty bottles, the bottle and contents shaken well, the ether allowed to separate, and the ether transferred by a syphon to the second bottle, which is then shaken, and the ether separated and transferred to the third bottle, and so on throughout the series of twenty bottles. Meanwhile, the sample of lipoic acids in the benzene solution is added to the first bottle and diluted to 50 ml. with peroxide-free ether. The bottle and contents are shaken, and the organic solvent layer which separated is transferred to the second bottle and the process repeated through the series of bottles. With each successive transfer of the lipoic acid sample, a 50 ml. portion of ether is added to the first bottle, and each other addition is shaken and transferred to a successive bottle until the lipoic acid sample is transferred through the twentieth bottle. Ebulition aids are then added to each bottle and the bottles are warmed until the ether in each bottle is evaporated.

The bottles are biologically analyzed by the pyruvate oxidation or acetate-replacing factor methods to locate the active material.

For the isolation of the α-lipoic acid tubes 14 to 18 (containing 2.6 million units), are combined, acidified with hydrochloric acid to about pH 2.0, and extracted twice with equal volumes of ether. Evaporation of the ether gives 1,240,000 POF units (or 47 percent of the α-lipoic acid indicated by assay of separate bottles) at a potency of 3,000 POF units per mg. Further extraction results in the recovery of up to about 90 percent of the α-lipoic acid in these cuts.

For the isolation of β-lipoic acid, tubes 1 to 3 (containing 2 million POF units) are combined and brought to pH 1.0 by the addition of hydrochloric acid. Threefold extraction with 100 ml. portions of ether give about 1,320,000 units (or 66 percent of the β-lipoic acid present in these tubes) at a potency of 2,100 POF units. More material can be recovered by further extraction at pH 0.7 to a total recovery of about 90 percent.

*Example 5*

α- and β-lipoic acids are esterified as follows: One million POF units of each of α- and β-lipoic acids are dissolved in 50 ml. benzene and the solutions are separately treated in the cold with 40 ml. of a benzene solution of diazomethane prepared from 10 g. N-nitroso-N-methyl urea, 30 ml. 40 percent potassium hydroxide solution, and 100 ml. of benzene. After standing 1 hour in an ice bath and overnight at room temperature, the benzene is removed in vacuo on a steam bath leaving each ester in the form of a residual oil. The esters are each separately dissolved in 50 ml. of benzene and assayed. The yield in each case is about the theoretical amount obtainable.

*Example 6*

α- and β-lipoic acid methyl esters are hydrolysed as follows: One milliliter of each of methyl α-lipoate and methyl β-lipoate (22,500 POF units) is placed in a test tube and 2 ml. of a 1 N hydrochloric acid are added, and the mixtures are autoclaved for 25 minutes at 15 pounds pressure (121° C.). After cooling 2 ml. of alcohol are added to make the solution homogenous for assay and countercurrent extraction. The yields of free acids and the distribution of activity between the α- and β-lipoic acids obtained upon hydrolysis and as determined by biological test are given in Table VI.

TABLE VI

| Hydrolysis material | Yield POF, units | Percentage α-lipoic acid | Composition β-lipoic acid |
|---|---|---|---|
| Methyl α-lipoate | 22,600 | 71 | 29 |
| Methyl β-lipoate | 24,200 | 22 | 78 |

Example 7

The alkaline hydrolysis of α- and β-lipoic acid methyl esters is as follows: One milliliter of each ester in benzene (22,500 units) is shaken with 2 ml. of a 1 percent potassium hydroxide solution for 1 hour (2 hours for the ester of β-lipoic acid). At the end of this time, 2 ml. alcohol are added to each mixture to obtain a clear solution. The yields of the free acids as determined by biological test and the relative percentages of α- and β-lipoic acids are given in Table VII.

TABLE VII

| Saponification material | Yield POF, units | Percentage α-lipoic acid | Composition β-lipoic acid |
|---|---|---|---|
| Methyl α-lipoate | 20,000 units | 90 | 10 |
| Methyl β-lipoate | 2,000 (10 percent) | 47 | 53 |

It is noteworthy that loss of activity of the β-ester is accompanied by some conversion to the α-form. Sodium, potassium and barium hydroxide under these conditions cause some loss of activity. The loss of activity is not due to alkaline air oxidation since the addition of cysteine, hydroquinone, or sodium thioglycollate does not appreciably prevent this loss.

Example 8

α- and β-lipoic acids are interconverted as follows: 10 ml. of each of α- and β-lipoic acids (12,400 POF units/mg. of α-lipoic acid; 13,200 POF units/mg. of β-lipoic acid) in benzene are evaporated in test tubes. Two ml. of 4 N hydrochloric acid are added to the α-lipoic tube and 2 ml. of 4 N HCl in 50 percent aqueous ethanol are added to the β-lipoic acid tube. After treatment in an autoclave for 1 hour at 120° C., the solutions are neutralized, assayed, and countercurrented at pH 6.5. The results are summarized in Table VIII.

TABLE VIII

| Lipoic acid | 4 N HCl in— | Start POF, units | End POF, units | Yield, percent | Composition α-lipoic acid, percent | β-lipoic acid, percent |
|---|---|---|---|---|---|---|
| Alpha | Water | 12,400 | 9,550 | 77 | 58 | 42 |
| Beta | 50 percent alcohol | 13,200 | 11,500 | 87 | 93 | 7 |

It is noteworthy that in the presence of ethanol almost complete conversion of β- to α-lipoic acid occurs under prolonged acid conditions.

Example 9

The methyl ester of β-lipoic acid is obtained in substantially pure form in the following manner: A solution of 2.749 g. of methyl β-lipoate in 55 ml. of benzene, which is obtained by the procedure described in Example 2, is chromatographed on cyanide-treated alumina, and the column is eluted with ethyl acetate and benzene in accordance with Table IX. 90 g. of alumina are employed in a column of 1.5 cm. internal diameter.

TABLE IX

| Fraction | Eluting solvent | Total volume of eluate, cc. | Weight solids | Activity POF, units/mg. | Total activity |
|---|---|---|---|---|---|
| β-Ester | | | 2.749 g. | 4,860 | 13,300,000 |
| 1-4 | 5 percent ethyl acetate in benzene. | 250 | | | |
| 5-9 | do | 250 | 596 mg | 720 | 430,000 |
| 10-12 | do | 150 | 210 mg | 3,560 | 750,000 |
| 13-16 | do | 200 | 219.6 mg | 5,500 | 1,200,000 |
| 17-19 | do | 150 | 114.8 mg | 12,700 | 1,460,000 |
| 20-26 | do | 350 | 213.5 mg | 14,000 | 3,000,000 |
| 27-30 | do | 200 | 97.5 mg | 16,730 | 1,630,000 } 78% |
| 31-35 | do | 250 | 98.6 mg | 16,860 | 1,660,000 |
| 36-40 | do | 250 | 83.6 mg | 11,150 | 930,000 |
| 41-42 | do | 200 | 59.5 mg | 8,400 | 500,000 |
| 43 | Ethyl acetate | 100 | | | 173,000 |

Fractions 13 to 25 are combined and are chromatographed on a "Florisil" column by the same technique as is used on the alumina column. The benzene-ethyl acetate eluates containing the β-ester are combined and evaporated in vacuo yielding the methyl β-lipoate in substantially pure form.

Example 10

4 kg. of wet penicillium mycelia obtained by filtering a commercial penicillin medium grown for the purpose of producing penicillin, are suspended in about 25 liters of water. To the suspension are added 300 ml. of ether and a sufficient amount of toluene to cover the surface of the suspension to a depth of about ¼ inch. The suspension is incubated at a temperature of about 37° C for about 48 hours. A filter aid such as "Celite" is added and the mixture is filtered. The filtrate is acidified to about pH 1 with 6 N sulfuric acid and the acidified filtrate is extracted with four 1-liter portions of benzene. The benzene extracts are combined and the benzene and such toluene and ether as are carried along, are evaporated in vacuo. The residual oil is esterified with diazomethane in accordance with the procedure of Example 5 and the methyl esters of the mixed α- and β-lipoic acids are purified by chromatographic adsorption on alumina as described in Example 2.

Example 11

2½ kg. of liver residue are suspended in water, and 10 g. of triple strength pancreatin are added. The pH of the mixture is adjusted to pH 7.2. 300 ml. of ether and sufficient toluene are added to the mixture to cover the surface of the mixture to a depth of about ¼ inch, and the mixture is incubated at 37° for 18 hours. The resulting mixture is worked up in accordance with the procedure of Example 10 to yield the α- and β-lipoic acids.

Example 12

*Preparation of sodium α-lipoate.*—A suspension of 5 mg. of α-lipoic acid in 5 ml. of water is titrated with shaking with 0.01 N sodium hydroxide solution until the lipoic acid has dissolved and the solution is at about pH 7.8. The solution is evaporated to dryness yielding the sodium salt of α-lipoic acid as white crystalline salt.

In a similar manner there are prepared the lithium, potassium, calcium and ethanolamine salts of both α- and β-lipoic acids.

Example 13

*Preparation of benzyl β-lipoate.*—10 mg. of crude β-lipoic acid containing about 100,000 POF unit/mg. are dissolved in about 15 ml. of benzyl alcohol and the solution is saturated with dry hydrogen chloride gas and allowed to stand in a stoppered vial for about 24 hours. The solution is diluted with an equal volume of benzene and extracted twice with N/10 sodium bicarbonate solution. The benzene layer is chromatographed on an alumina column in accordance with the procedure of Example 9. The benzyl β-lipoate which is eluted from the column with ethyl acetate, is recovered as an oil by the evaporation in vacuo of the ethyl acetate.

*Example 14*

About 0.02 g. of methyl β-lipoate (about 2,000,000 POF units) are heated in an autoclave at 120° C. for 15 minutes with 10 ml. of 1 N hydrochloric acid. The hydrolyzed solution is extracted eight times with equal volumes of peroxide-free ether. The ether extracts are combined and evaporated to dryness. The residue, consisting of β-lipoic acid, is distributed over a 10 tube counter-current system employing a solvent consisting of potassium chloride in hydrochloric acid buffer (pH 2.3) and ether. 5 ml. of each phase is used per tube. Pyruvate oxidation factor assays of each of the 10 tubes gives the following activity values:

| Tube | POF units | Percent of total units |
|---|---|---|
| 1 | 0 | 0 |
| 2 | 4,000 | 4.7 |
| 3 | 8,000 | 9.3 |
| 4 | 18,000 | 21.0 |
| 5 | 22,000 | 25.6 |
| 6 | 15,000 | 17.5 |
| 7 | 12,000 | 14.0 |
| 8 | 4,000 | 4.7 |
| 9 | 2,000 | 2.3 |
| 10 | 1,000 | 1.2 |
| Total | 86,000 | |

The aqueous fractions in counter-current tubes 3 through 7 are combined with similarly obtained fractions from additional hydrolyses and counter-current extractions, and adjusted to pH 0.7 with hydrochloric acid, and the acidified mixture is extracted 5 times with equal volumes of peroxide-free ether. The ether is evaporated to dryness and the residue is extracted with absolute alcohol. The alcohol extract is evaporated and the residue is taken up with thiophene-free benzene, filtered, and evaporated to dryness. The residue is dissolved in pure n-heptane and cooled in an ice bath, yielding a precipitate of β-lipoic acid. From the mixture the crystals are separated by centrifugation.

SYNTHESIS OF LIPOIC ACID

Lipoic acid may be made from 4-(α-tetrahydrofuryl)-butyric acid by heating the acid with thiourea and hydrobromic acid under pressure, by converting the acid into dibromooctanoic acid by heating with hydrobromic acid and heating the crude dibromooctanoic acid with thiourea, or by converting the acid into bromolactone by heating successively with hydrobromic and sulfuric acid and heating the bromolactone with thiourea and hydrobromic acid.

4-(α-tetrahydrofuryl)-butyric acid may be made by condensing furfural and acetaldehyde to furylacrolein, reducing the latter to 3-(α-tetrahydro)-propanol-1, and converting the propanol successively to the corresponding bromide, nitrile and carboxylic acid. The propanol can also be made by reduction of furylacrylic acid successively to 3-(α-tetrahydrofuryl)-propionic acid and then to the alcohol.

*Example 15*

*3-(α-tetrahydrofuryl)-propanol-1.*—Furfural and acetaldehyde were condensed in the presence of sodium hydroxide to give furylacrolein, which is reduced according to the method of Burdick and Adkins (J. Am. Chem. Soc. 56, 438 (1934), to 3-(α-tetrahydrofuryl)-propanol-1. After removal of the solvent and a forerun, the reduced product boils at 97° (12 mm.), $n^{20}D$ 1.4575. The yield is 82% of the theoretical amount.

This same alcohol is obtained from 3-(α-tetrahydrofuryl)-propionic acid in an 89% yield by reduction with lithium aluminum hydride. The 3-(α-tetrahydrofuryl)-propionic acid is prepared from furylacrylic acid in 40% yield. (E. Schwenk, D. Papa, H. Hankin and H. Ginsberg, Org. Syntheses, 27, 68 (1947).)

*1-bromo-3-(α-tetrahydrofuryl)-propane.*—Thirty milliliters of distilled phosphorus tribromide and 500 ml. of dry ether are placed in a liter three-necked flask, equipped with an addition tube, a Hershberg type wire stirrer, a reflux condenser, and cooled to 0°. Atmospheric moisture is excluded with a calcium chloride tube. To the cold, rapidly stirred solution of phosphorus tribromide, 106.5 g. of 3-(α-tetrahydrofuryl)-propanol-1 in 200 ml. of dry ether are added slowly over a period of ¾ of an hour, and the reaction mixture stirred an additional hour in the cold. The ether solution is decanted into ice and the precipitate decomposed by shaking with water. The ether and water layers are separated, the ether layer washed with water, 5% sodium bicarbonate solution and water, and dried over anhydrous sodium sulfate. The solvent is removed in vacuo. The yield of 1-bromo-3-(α-tetrahydrofuryl)-propane is 112 g. or 71%. This bromide is distilled through a 3-cm. Vigreux column, and boils at 58–60° (1.0 mm.), $n^{19}D$ 1.4850.

*4-(α-tetrahydrofuryl)-butyronitrile.*—A mixture of 112 g. of 1-bromo-3-(α-tetrahydrofuryl)-propane, 41 g. of sodium cyanide, 115 ml. of alcohol and 52 ml. of water is heated under reflux for 19 hours. The reaction mixture is diluted with five volumes of water, and the nitrile extracted from the aqueous layer with three 200-ml. portions of ether. The combined ether layers are washed with water and dried over anhydrous sodium sulfate. Evaporation of the solvent gives 72 g., 89.5% of the theoretical amount, of crude nitrile. The nitrile may be purified by distillation first or hydrolyzed directly. The nitrile boils at 59–61° (0.5 mm.), $n^{20}D$ 1.4510, yield 55–65%.

*4-(α-tetrahydrofuryl)-butyric acid.*—A mixture of 72 g. of 4-(α-tetrahydrofuryl)-butyronitrile, 72 g. of sodium hydroxide, 200 ml. of water and 110 ml. of ethanol is heated under reflux for 24 hours, or until the evolution of ammonia gas has ceased. The reaction mixture is cooled, poured into two volumes of water, and the basic solution extracted with two portions of ether. The water layer is cooled in an ice-bath, acidified carefully with concentrated hydrochloric acid, and extracted six times with ether. The combined ether extracts are dried over anhydrous sodium sulfate. After removal of the solvent the 4-(α-tetrahydrofuryl)-butyric acid is distilled using a Claisen head; yield 45 g. of pure acid, B.P. 160–165° (1 mm.), $n^{25}D$ 1.457. The overall yield of acid based on the 1-bromo-3-(α-tetrahydrofuryl)-propane is 49% without purification of the intermediates.

4-(α-tetrahydrofuryl)-butyric acid may be prepared from 1-bromo-3-(α-tetrahydrofuryl)-propane in improved yield without isolation of the nitrile by the procedure of Lewis and Susi (J. Am. Chem. Soc. 74, 840 (1952)). 0.45 mole of 1-bromo-3-(α-tetrahydrofuryl)-propane, and 0.50 mole of reagent-grade sodium cyanide are heated with stirring in 150 ml. of ethylene glycol. After about 20 minutes, a thermometer suspended in the vapors above the surface of the reaction shows no further rise in temperature. The reaction mixture is refluxed for an additional 20 minutes, and 0.9 mole of sodium hydroxide and 2.0 moles of water are added. The mixture is refluxed for 36 hours, or until no more ammonia gas is evolved. The acid was isolated as above. The over-all yield of acid from the bromide was 67%.

*Ring cleavage of tetrahydrofurylbutyric acid—(Formation of bromolactones).*—With good stirring, 71.3 g. of 4-(α-tetrahydrofuryl)-butyric acid in 145 ml. of 40% hydrobromic acid is heated on a steam-cone. To this mixture is added, over a period of 20 minutes, 89 ml. of concentrated sulfuric acid. After heating for an additional hour, the mixture is cooled in an ice-bath and extracted twice with 100-ml. portions of chloroform. The organic layer is washed once with cold water and the solvent removed by a flash distillation, to give a dark oil which is distilled through a Claisen head, B.P. 180–200° (15 mm.), to yield 92 g. (92%) of crude bromolactone. The distillate disclored rapidly on standing. This crude bromolactone is used to prepare lipoic acid.

*Preparation of dibromooctanoic acid.*—Fifty-five grams of 4-(α-tetrahydrofuryl)-butyric acid and 103 ml. of 40% hydrobromic acid are heated to 100° on a steam-bath with stirring. To this hot, rapidly-stirred mixture is added 75 ml. of concentrated sulfuric acid over a period of 15 minutes. The mixture is heated for an additional half-hour, cooled, and mixed with 100 g. of ice. The crude dibromo acid is extracted from the cooled reaction mixture with three 100-ml. portions of chloroform. The dibromo acid is extracted from the chloroform with two 200-ml. portions of 5% sodium bicarbonate solution. The bicarbonate solution is cooled, acidified carefully with concentrated hydrochloric acid, and the dibromo acid is extracted with three 100-ml. portions of ethyl acetate. The organic layer is dried over anhydrous sodium sulfate and the solvent removed in vacuo to yield 11.5 g. (11%) of the unstable dibromooctanoic acid as an oil.

*Preparation of lipoic acid*—(A) *From 4-(α-tetrahydrofuryl)-butyric acid.*—One-half gram of 4-(α-tetrahydrofuryl)-butyric acid, 0.3 g. of thiourea and 1.0 ml. of 40% hydrobromic acid are sealed in an ampoule and heated in a bath of refluxing acetic acid (110°) for 11.5 hours. After cooling, the ampoule is opened and the contents dissolved in 9 ml. of 5% sodium hydroxide solution. After standing at room temperature for two hours, the mixture is acidified, extracted with portions of benzene; yield 1,200,000 units of lipoic acid activity. Similar treatment with concentrated hydrochloric acid or 50% sulfuric acid instead of 40% hydrobromic acid also gives lipoic acid activity.

(B) *From dibromooctanoic acid and thiourea.*—Crude dibromooctanoic acid (1.98 g.), thiourea, 2.50 g., and absolute ethanol, 1.0 ml., are sealed in an ampoule and heated in a bath at 190° for 15 minutes. After about five minutes, the contents of the ampoule becomes a solid crystalline mass. The ampoule is cooled, opened, and the crystalline material dissolved in 50 ml. of concentrated ammonium hydroxide and autoclaved at 120° for one-half hour; yield 7,500,000 units of lipoic acid activity.

(C) *From bromolactone.*—A mixture of 10 g. of the crude bromolactone, 6 g. of thiourea and 10 ml. of 40% hydrobromic acid is refluxed for 10 hours. The mixture is diluted to a total volume of 500 ml. with distilled water, solid potassium carbonate added until the solution is neutral, then 5 g. of solid potassium hydroxide added with good stirring. The mixture is heated in an autoclave at 120° for 30 minutes, the solution cooled, and extracted with one 100-ml. portion of chloroform. The alkaline solution is acidified with 10 ml. of concentrated sulfuric acid, and extracted with 500 ml. of benzene in five portions. The yield is 370,000,000 units of lipoic acid activity.

*Oxidation to disulfide.*—A benzene extract containing 47.35 g. of solids and 214,500,000 units of crude α-lipoic acid activity, is evaporated to small volume and dissolved in 6 liters of chloroform and 1800 ml. of water. The two phase system is stirred vigorously in an atmosphere of nitrogen while 197 ml. of iodoform reagent was added. The end-point is determined by the disappearance of the nitroprusside test for sulfhydryl groups and the appearance of a slight excess of iodine. The aqueous phase is separated and discarded. The chloroform phase is washed twice with 1500-ml. portions of 1% sodium thiosulfate and twice with 1500-ml. portions of water, and the inactive washes discarded. The activity is extracted from the chloroform phase with ten 350-ml. portions of 5% sodium bicarbonate. After washing with 200 ml. of low-boiling petroleum ether, the bicarbonate solution is acidified to pH 1 by addition of 400 ml. of 6 N sulfuric acid and extracted with six 350-ml. portions of benzene. The benzene extract is washed with 150 ml. of water and concentrated in vacuo to a solids concentration of about 240 mg./ml. The oxidized product (37.48 g.) is obtained without significant loss in total activity.

*Methyl lipoate.*—A cold benzene solution containing 59.64 g. of the crude disulfide prepared as above is added to 600 ml. of a cold benzene solution of diazomethane prepared from 70 g. of nitrosomethylurea. After standing one hour in an ice-bath and one hour at room temperature, the solution is concentrated in vacuo to about two-thirds volume. The benzene solution is washed successively with small amounts of water, 1% sodium bicarbonate, water, 1% acetic acid, and water, with no significant loss of activity. The benzene is removed in vacuo leaving 56.98 g. of a solvent-free oil containing essentially all the activity.

This ester (60.7 g.) is slurried in a minimal amount of n-heptane and introduced onto a column (8-cm. diameter) prepared from a slurry of 2400 g. activated alumina in n-heptane. The bulk of the solids is eluted with increasing amounts of benzene in heptane. At a concentration of 50% benzene in heptane the activity is eluted.

*Crystallization of synthetic DL-α-lipoic acid.*—The most potent of the alumina column fractions are pooled, and the solvent removed in vacuo. The oil is suspended in 500 ml. of 0.1 N potassium hydroxide and shaken continuously in an atmosphere of nitrogen for 16 hours at 25°. The alkaline solution is washed with 150 ml. of low-boiling petroleum ether in two portions. No activity is removed. The alkaline solution is acidified to pH 1, by adding 10 ml. of 6 N sulfuric acid, and extracted with 400 ml. of benzene in five portions. After washing with 25 ml. of water, the benzene contains 236,000,000 units. Evaporation in vacuo gives 2.485 g. of solvent-free yellow oil. The oil is extracted by slurrying with several small (10-ml.) portions of hot low-boiling petroleum ether, leaving a residue of 204 mg. of insoluble oil. The extract (50 ml.) is allowed to cool slowly. The resulting small yellow platelets (1.4 g.) are collected and dried. The mother liquor contains 910 mg. of a non-crystallizable oil. After two recrystallizations from low-boiling petroleum ether the product melts at 59–60° (cor.) and possesses one-half the biological activity on a weight basis of α-lipoic acid from natural sources.

The usual over-all yield to crystalline DL-α-lipoic acid (based on the crude bromolactone) is about 4%.

This application is a continuation-in-part of our application Serial No. 245,082, filed September 4, 1951, now abandoned.

We claim:
1. Compounds of the group consisting of α-lipoic acid; β-lipoic acid, the lower alkyl esters and the water-soluble non-toxic salts thereof.
2. α-Lipoic acid.
3. β-Lipoic acid.
4. Lower alkyl esters of α-lipoic acid.
5. Lower alkyl esters of β-lipoic acid.
6. The water-soluble non-toxic salts of α-lipoic acid.
7. The water-soluble non-toxic salts of β-lipoic acid.

References Cited in the file of this patent

UNITED STATES PATENTS

| | | |
|---|---|---|
| 2,218,181 | Searle et al. | Oct. 15, 1940 |
| 2,317,378 | Harris | Apr. 27, 1943 |
| 2,728,668 | Mochel | Dec. 27, 1955 |
| 2,759,005 | Starker et al. | Aug. 14, 1956 |
| 2,766,241 | Petering | Oct. 9, 1956 |
| 2,766,257 | Holly et al. | Oct. 9, 1956 |
| 2,801,261 | Hornberger | July 30, 1957 |
| 2,877,235 | Hornberger | Mar. 10, 1959 |

OTHER REFERENCES

Stokstad et al.: Archives of Biochem. 20, 75–82 (1948).

Reed et al.: Science 114: 93 and 4 (July 27, 1951).

Bullock et al.: J.A.C.S., vol. 74, page 3455 (1952).